United States Patent
Fink et al.

(10) Patent No.: US 9,964,387 B2
(45) Date of Patent: May 8, 2018

(54) INSENSITIVE MUNITIONS SWAGED VENT PLUG

(75) Inventors: Kenneth Fink, Elk River, MN (US);
David A. Smith, St. Paul, MN (US);
Craig F. Borchard, Mendota Heights, MN (US); David J. Fehr, Rogers, MN (US); Scott V. Hanson, Excelsior, MN (US); Mark J. Shireman, Minnetonka, MN (US); Robert J. Stanek, Champlin, MN (US); John S. Koshuba, Fridley, MN (US)

(73) Assignee: ORBITAL ATK, INC., Plymouth, MN (US)

( * ) Notice: Subject to any disclaimer, the term of this patent is extended or adjusted under 35 U.S.C. 154(b) by 1535 days.

(21) Appl. No.: 12/543,938

(22) Filed: Aug. 19, 2009

(65) Prior Publication Data

US 2012/0255456 A1    Oct. 11, 2012

(51) Int. Cl.
*F42B 39/14*    (2006.01)
*F42B 39/20*    (2006.01)
*B23P 11/00*    (2006.01)

(52) U.S. Cl.
CPC .............. *F42B 39/20* (2013.01); *F42B 39/14* (2013.01); *B23P 11/00* (2013.01); *Y10T 29/49826* (2015.01)

(58) Field of Classification Search
CPC .................................. F42B 39/20; F42B 39/14
USPC .......... 102/473, 481, 374, 377, 378; 60/223, 60/253, 254; 220/89.1, 89.2, 89.3, 89.4
See application file for complete search history.

(56) References Cited

U.S. PATENT DOCUMENTS

| | | | | |
|---|---|---|---|---|
| 2,216,351 A | * | 10/1940 | Miller | 122/504.3 |
| 3,665,857 A | * | 5/1972 | Radnich et al. | 102/481 |
| 3,713,386 A | * | 1/1973 | Zaid | 102/376 |
| 3,927,791 A | | 12/1975 | Hershberger | |
| 4,537,320 A | * | 8/1985 | Nielsen | 215/276 |
| 4,690,670 A | * | 9/1987 | Nielsen | 494/16 |
| 5,035,180 A | | 7/1991 | Purcell et al. | |
| 5,035,182 A | | 7/1991 | Purcell et al. | |
| H1144 H | * | 3/1993 | Cherry et al. | 60/39.1 |
| 5,466,537 A | * | 11/1995 | Diede et al. | 428/548 |
| 6,227,095 B1 | | 5/2001 | Woodall et al. | |
| 6,247,410 B1 | | 6/2001 | Garcia | |
| 6,338,242 B1 | | 1/2002 | Kim et al. | |
| 6,363,855 B1 | | 4/2002 | Kim et al. | |
| 6,370,756 B1 | * | 4/2002 | Conger et al. | 29/423 |
| 6,523,477 B1 | | 2/2003 | Brooks et al. | |
| 6,955,125 B1 | * | 10/2005 | Mazzei et al. | 102/445 |
| 7,331,292 B1 | | 2/2008 | Kim et al. | |
| 7,353,755 B2 | * | 4/2008 | Aumasson et al. | 102/481 |
| 7,451,703 B1 | | 11/2008 | Dabiri | |
| 7,739,956 B2 | * | 6/2010 | Ljungwald et al. | 102/481 |
| 8,042,472 B2 | * | 10/2011 | Lubbers | 102/430 |

(Continued)

FOREIGN PATENT DOCUMENTS

| DE | 3335970 A | * | 4/1985 |
|---|---|---|---|
| FR | 2627272 A | * | 8/1989 |

*Primary Examiner* — James S Bergin
(74) *Attorney, Agent, or Firm* — Vidas Arrett & Steinkraus

(57) ABSTRACT

A venting system for ordnance or rocket motors comprising a casing having at least one hole and a plug, the plug being formed from a plug slug swaged into the at least one hole. A method to fill a vent hole in a casing comprising transforming a plug slug positioned within the vent hole into a plug.

15 Claims, 3 Drawing Sheets

(56) References Cited

U.S. PATENT DOCUMENTS

2002/0020454 A1\* 2/2002 Dassis ........................... 138/98
2008/0006170 A1\* 1/2008 Haeselich ..................... 102/470

\* cited by examiner

INSENSITIVE MUNITIONS SWAGED VENT PLUG

STATEMENT REGARDING FEDERALLY SPONSORED RESEARCH

The U.S. Government has a paid-up license in this invention and the right in limited circumstances to require the patent owner to license others on reasonable terms as provided for by the terms of Contract No. W15QKN-05-C-1171 awarded by the Department of the Army.

CROSS-REFERENCE TO RELATED APPLICATIONS

Not Applicable

FIELD OF THE INVENTION

This invention relates to the field of venting ordnance, rocket motors, and warheads.

BACKGROUND OF THE INVENTION

Ordnance and rocket motors contain energetic materials such as explosives. These energetic materials can ignite in an unplanned manner due to internal pressure, excess heat, or other conditions. Venting of ordnance, rocket motors, and warheads can reduce the unplanned ignition of these energetic materials.

BRIEF SUMMARY OF THE INVENTION

A venting system for ordnance, rocket motors, or warheads comprising a casing having at least one hole and a plug, the plug being formed from a plug slug swaged or crimped into the at least one hole.

A method to fill a vent hole in a casing comprising transforming a plug slug positioned within the vent hole into a plug.

DETAILED DESCRIPTION OF THE INVENTION

Figure 1:
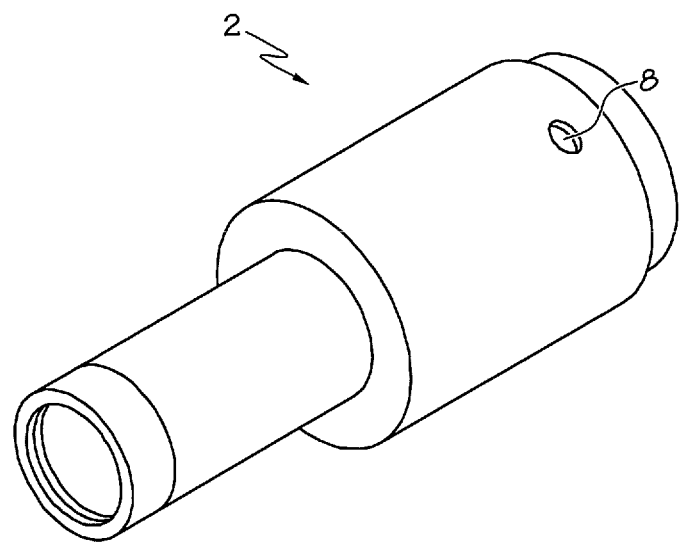
FIG. 1 is a perspective view of a casing with a hole.

While this invention may be embodied in many forms, there are described in detail herein specific embodiments of the invention. This description is an exemplification of the principles of the invention and is not intended to limit the invention to the particular embodiments illustrated.

For the purposes of this disclosure, like reference numerals in the figures shall refer to like features unless otherwise indicated.

FIG. 1 shows an example of a casing 2 that is configured to contain materials that can explode or ignite. Non-limiting examples of casings include an ordnance casing, a casing of a rocket motor, or a casing for a warhead. In one embodiment, the casing is the casing of a 120 mm XM 395 Precision Guided Mortar Munition warhead.

Figure 2:
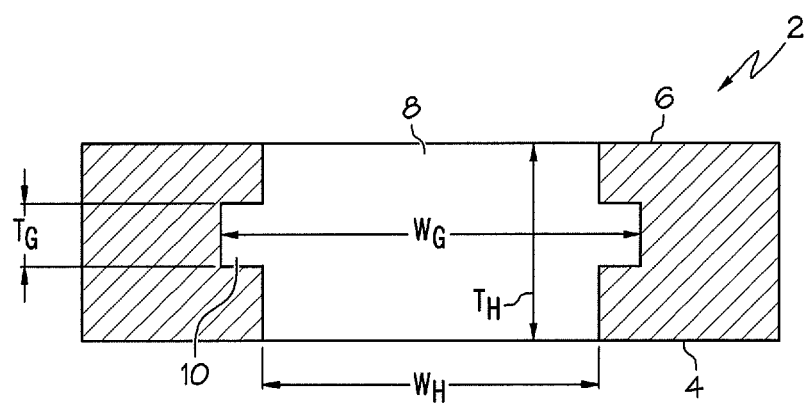
FIG. 2 is a cross-sectional view of an embodiment of a hole in a casing.

As shown in FIG. 2, the casing 2 has a first surface 4, a second surface 6, and at least one hole 8. In some embodiments, the first surface 4 is the outer surface of the casing and the second surface 6 is the inner surface of the casing. In other embodiments, the first surface 4 is the inner surface of the casing and the second surface 6 is the outer surface of the casing. It is within the scope of the invention for the casing 2 to have one, two, three, four, five, six, or more holes 8. Each hole 8 extends from the first surface 4 of the casing 2 to the second surface 6 of the casing 2. The hole 8 can be described as a venting area or vent hole. Although the hole 8 in FIG. 1 is substantially round-shaped, it is within the scope of the invention for the hole 8 to have any shape, for example, square shaped or rectangular shaped.

As shown in the cross-sectional view of FIG. 2, the hole 8 has a width ($W_H$) as measured across the hole, and a thickness ($T_H$) measured from the first surface 4 of the casing 2 to the second surface 6 of the casing 2. The hole width ($W_H$) is about 6 mm to about 50 mm. The hole thickness ($T_H$) is about 3 mm to about 25 mm.

Figure 4:
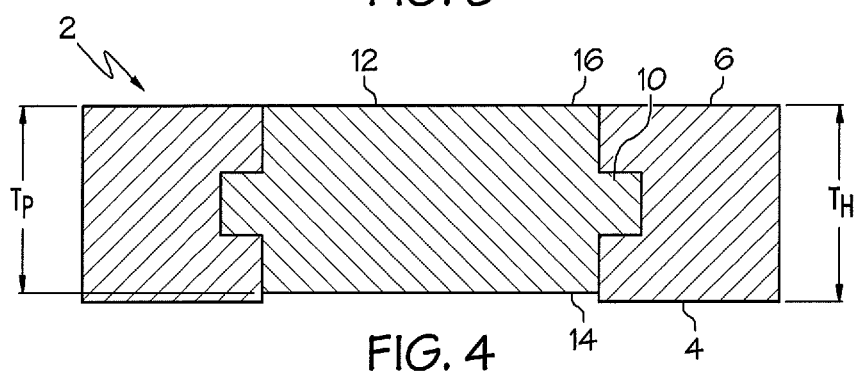
FIG. 4 is a cross-sectional view of a plug in the hole shown in FIG. 2.
Figure 5:
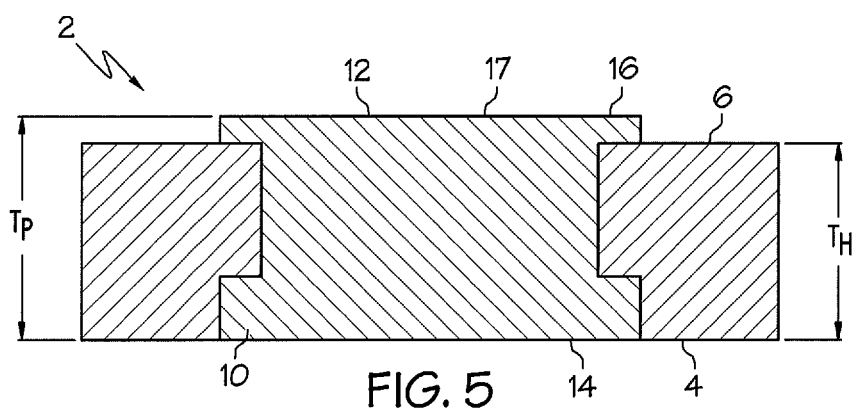
FIG. 5 is a cross-sectional view of an embodiment of a hole in a casing with a plug therein.
Figure 6:
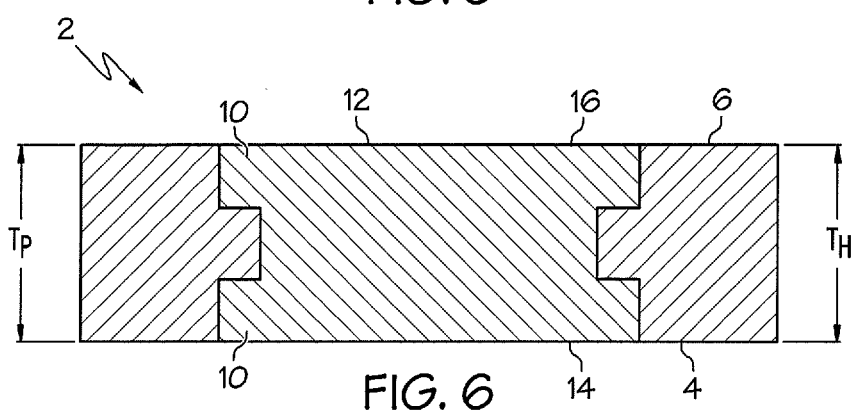
FIG. 6 is a cross-sectional view of an embodiment of a hole in a casing with a plug therein.
Figure 7:
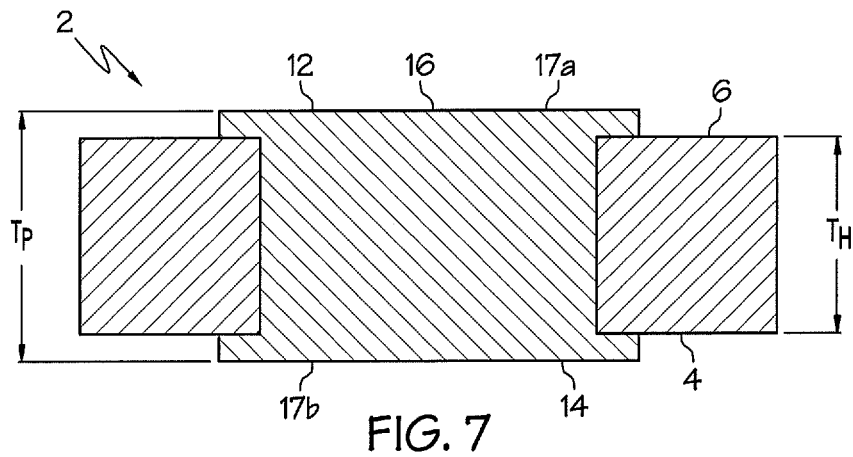
FIG. 7 is a cross-sectional view of an embodiment of a hole in a casing with a plug therein.

Although FIG. 2 shows a hole 8 with one groove 10, it is within the scope of the invention for the hole 8 to have one, two, three, four, or more grooves 10. It is also within the scope of the invention for the hole 8 to have no grooves, as shown in FIG. 7. An example of a hole with multiple grooves is the hole 8 shown in FIG. 6 which has two grooves 10. It is also within the scope of the invention for the groove(s) 10 to have any position(s) between the first and second surfaces 4,6 of the casing 2. For example, the groove 10 in FIG. 4 is substantially midway between the first and second surfaces 4,6 of the casing 2, while the groove 10 shown in FIG. 5 is adjacent to the first surface 4 of the casing 2. In FIG. 6, the hole 8 has one groove 10 that is adjacent to the first surface 4 of the casing 2 and another groove 10 that is adjacent to the second surface 6 of the casing 2.

In at least one embodiment, the groove 10 extends about the entire perimeter of the hole 8. In some embodiments, the groove 10 extends about only a portion of the perimeter of the hole 8. In this embodiment, the groove 10 can be described as a notch groove. The hole 8 shown for example in FIG. 2 may also be described as showing a cross-section of a hole with two notch grooves that are positioned opposite one another. It is within the scope of the invention for a hole to have grooves, notch grooves, and any combination thereof.

Each groove 10 and each notch groove has a width. It is within the scope of the invention for a groove 10, or a notch groove, to have any width. In the figures the width of a groove is indicated by $W_G$. In at least one embodiment, the groove width ($W_G$) is greater than the hole width ($W_H$), as shown, for example, in FIG. 2. In some embodiments, the groove width ($W_G$) is about equal to the hole width ($W_H$) to about equal to the hole width+6 mm ($W_H$+6 mm). In other embodiments, the groove width ($W_G$) is up to about 20% greater than the hole width ($W_H$). The width of a notch groove ($W_{NG}$, not shown) is the distance from the side of the hole to the side of the notch groove. In this embodiment, the notch groove width ($W_{NG}$) is at most about 3 mm. If two notch grooves are positioned opposite one another, it is within the scope of the invention for the notch groove width ($W_{NG}$) of each notch groove to be the same width or to be different widths.

Each groove 10 and each notch groove has a groove thickness ($T_G$). It is within the scope of the invention for a groove 10, or a notch groove, to have any groove thickness ($T_G$). In at least one embodiment, the groove thickness ($T_G$) is less than the hole thickness ($T_H$). In some embodiments, the groove thickness ($T_G$) is about 1 mm to about 6 mm. In at least one embodiment, the groove thickness ($T_G$) is at most about 50% of the hole thickness ($T_H$). If the hole 8 has more than one groove 10, the cumulative groove thickness is at most about 50% of the hole thickness ($T_H$). Thus, if the hole 8 has two grooves 10, the cumulative groove thickness is equal to $T_{G1}$ plus $T_{G2}$.

Although the two grooves 10 in FIG. 6 have substantially the same groove width ($W_G$) and groove thickness ($T_G$), it is within the scope of the invention for a hole 8 to have grooves with different widths, grooves with different thicknesses, notch grooves with different widths, notch grooves with different thicknesses, and any combination thereof.

Figure 3:
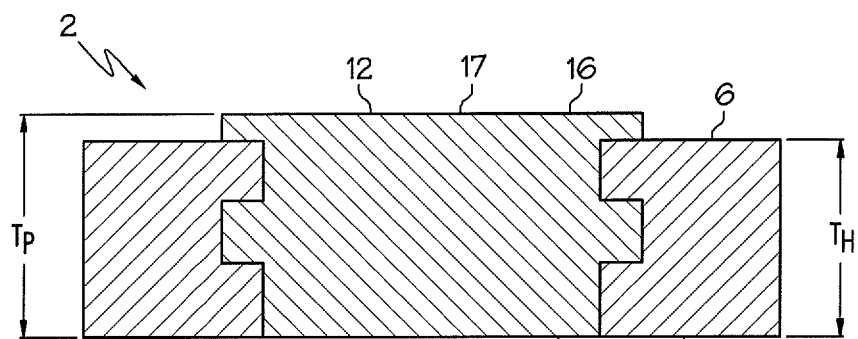
FIG. 3 is a cross-sectional view of a plug in the hole shown in FIG. 2.

In at least one embodiment, the hole 8 has a plug 12 disposed therein, as shown for example in FIG. 3. In at least one embodiment, the plug 12 enables the ordnance to comply with insensitive munition requirements, such as are detailed in Mil-Std-2105C and in AOP-39. In some embodiments, the groove(s) 10, or notch grooves, retains a plug 12 disposed in the hole 8.

As shown in the figures, the plug 12 has a first surface 14, a second surface 16, a width ($W_P$, not shown), and a thickness ($T_P$). In some embodiments, the first surface 14 is the outer surface of the plug and the second surface 16 is the inner surface of the plug. In other embodiments, the first surface 14 is the inner surface of the plug and the second surface 16 is the outer surface of the plug. In some embodiments, the plug width ($W_P$) is variable because at least one portion of the plug 12 has a width that is either equal to the groove width ($W_G$) or to the hole width ($W_H$) plus the notch groove width ($W_{NG}$), and at least one portion of the plug 12 has a width equal to the hole width ($W_H$). In other embodiments, the plug width ($W_P$) is at most equal to the hole width ($W_H$), for example when the hole 8 does not have any grooves or notch grooves.

In some embodiments, the plug thickness ($T_P$) is equal to the hole thickness ($T_H$), as shown, for example, in FIG. 6. In this embodiment, the first surface 14 of the plug 12 is flush with the first surface 4 of the casing 2 and the second surface 16 of the plug 12 is flush with the second surface 6 of the casing 2. Thus, the plug 12 utilizes 100% of the venting area. As used in this application, the venting area is the area of the hole 8 plus the area of each groove 10 or notch groove, if present.

In other embodiments, the plug thickness ($T_P$) is less than the hole thickness ($T_H$) so that at least one of the surfaces 14,16 of the plug 12 is below flush with at least one of the surfaces 4,6 of the casing 2. An example of a plug 12 that has one surface that is below flush is shown in FIG. 4. In still other embodiments, the plug thickness ($T_P$) is greater than the hole thickness ($T_H$). The plug 12 shown, for example, in FIG. 3 has a portion 17 that extends beyond the sides and beyond an opening of the hole 8. The plug 12 in FIG. 3 can be described as having a surface 16 that is "mushroomed" 17. The mushroomed plug 12 can be described as having a first portion that is disposed against a portion of the second surface 6 of the casing 2. A mushroomed surface 17 can also be described as a crimp cap. In some embodiments, the mushroomed surface/crimp cap 17 provides additional sealing of the hole 8. In at least one embodiment, both surfaces 14,16 of the plug 12 are mushroomed 17a,17b, as shown in FIG. 7. In this embodiment the mushroomed surfaces 14,16 retain the plug 12 in a hole 8 that does not have any grooves or notch grooves.

Figure 8:
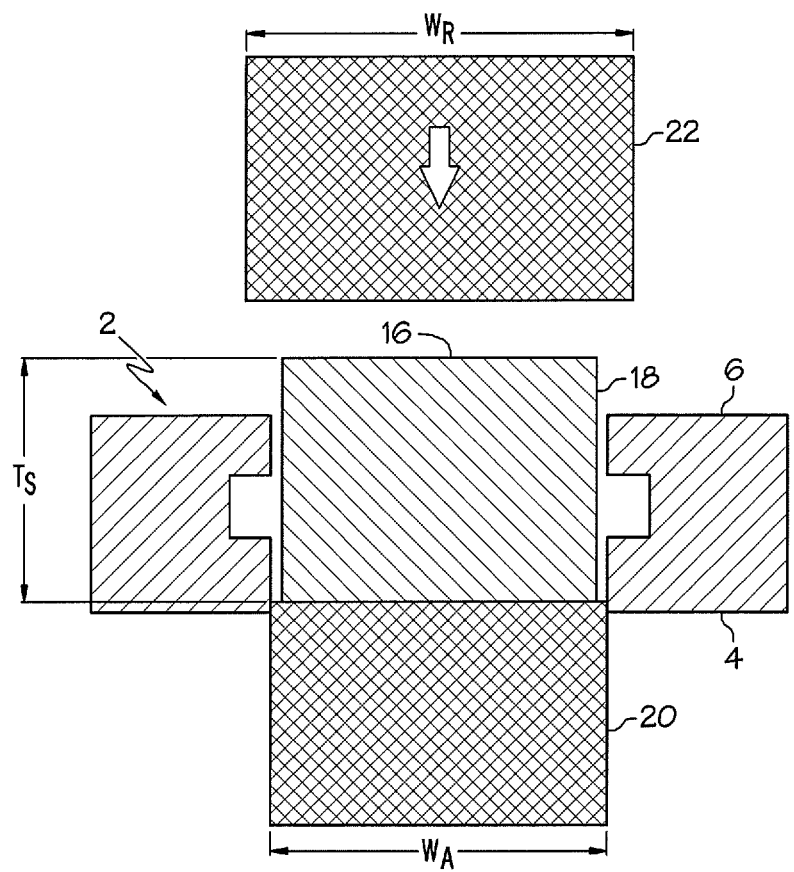
FIG. 8 is a cross-sectional view of a plug slug being swaged or crimped into the hole shown in FIG. 2.

In at least one embodiment, a plug slug 18 is transformed into a plug 12 by a swaging or crimping process. FIG. 8 shows a plug slug 18 disposed within the hole 8 prior to the swaging or crimping process. In at least one embodiment, the cooperative action of a ram 22 and an anvil 20 transforms the plug slug 18 into a plug 12. In some embodiments, the plug slug 18 has a first configuration before the swaging or crimping process and a second configuration after the swaging or crimping process where the second configuration is different than the first configuration.

As shown in FIG. 8, a ram 22 is positioned to press against the second surface 16 of the plug slug 18 and an anvil 20 is positioned against the first surface 14 of the plug slug 18. To swage or crimp the plug slug 18 into the hole 8, a plug slug is positioned within the hole 8, an anvil 20 is positioned against the first surface 14 of the plug slug 18, and a ram 22 presses against the second surface 16 of the plug slug 18. It is also within the scope of the invention for the anvil 20 to be positioned against the second surface 16 of the plug slug 18 and for the ram 22 to press against the first surface 14 of the plug slug 18. The action of the ram 22 against the plug slug 18 modifies the plug slug 18 into a plug 12 that has the same configuration as the hole 8.

The ram 22 has a width ($W_R$). In some embodiments, the ram width ($W_R$) is greater than the hole width ($W_H$), as shown for example in FIG. 8. In other embodiments, the ram width ($W_R$) is equal to the hole width ($W_H$).

The anvil 20 has a width ($W_A$). It is within the scope of the invention for the anvil width ($W_A$) to be greater than, equal to, or less than, the hole width ($W_H$). For example, the anvil 20 shown in FIG. 8, has sides that are adjacent to the sides of the hole 8, thus the anvil width ($W_A$) is at most equal to the hole width ($W_H$). In some embodiments, an anvil 20 with an anvil width ($W_A$) is at most equal to the hole width ($W_H$) is placed within hole 8 to produce a plug 12 that has a surface 14,16 that is not flush with a surface 4,6 of the casing 2. In other embodiments, an anvil 20 with an anvil width ($W_A$) greater than the hole width ($W_H$) is used to produce a plug 12 that has a surface 14,16 that is flush with a surface 4,6 of the casing 2.

In at least one embodiment, the ram width ($W_R$), the anvil width ($W_A$), the size of the plug slug 18, and combinations thereof, affect the attributes of the plug 12. For example, a plug 12 that is mushroomed is made from a plug slug 18 having a greater size than a plug slug 18 used to make a plug 12 with surfaces 14,16 flush with the surfaces 4,6 of the casing 2.

The plug slug 18 has a thickness ($T_S$) and a width ($W_S$, not shown). In at least one embodiment the plug slug thickness ($T_S$) is greater than the plug thickness ($T_P$). In some embodiments the plug slug 18 has a minimum plug slug thickness. A plug slug 18 with a minimum plug slug thickness forms a plug 12 that fills all portions/interfaces of the venting area (100% of the venting area) and that has surfaces 14,16 that are flush with the surfaces 4,6, of the casing 2, as shown for example in FIG. 6. Thus, the minimum plug slug thickness depends upon the venting area of the hole 8. In other embodiments, the plug slug 18 has a plug slug thickness that is greater than the minimum plug slug thickness. In this embodiment, the plug slug 18 to form a plug 12 with at least one surface that is mushroomed 17, as shown for example in FIG. 3. In still other embodiments, the plug slug 18 has a plug slug thickness that is less than the minimum plug slug thickness. In this embodiment, the plug slug 18 forms a plug 12 that has at least one surface 14,16 that is below flush, as shown in FIG. 4.

In at least one embodiment, the width of the plug slug 18 is at most equal to the hole width ($W_H$). In some embodiments, the width of the plug slug 18 is less than the hole width ($W_H$), as shown, for example, in FIG. 8. In at least one embodiment, the width of the plug slug 18 is greater than the hole width ($W_H$). In this embodiment, the plug slug 18 is press-fitted into the hole 8 to form the plug 12.

Embodiments include one or more of the following advantages. In some embodiments, a plug 12 formed by the swaging process is not subject to creep, unlike plastic plugs. In other embodiments, a plug 12 formed by the swaging process does not loosen due to vibrations or temperature variations, unlike a plug with threads (threaded plugs). In at least one embodiment, the swaged in place plug 12 has a dimensionally controlled surface with excellent environmental sealing, in contrast to a melt-in-place plug which has an un-controllable surface with poor environmental sealing. In at least one embodiment, the plug 12 is used in a hole 8 that is too thin for a threaded plug to be used. Typically, a threaded plug with threads is used with a hole that is at least 8 mm thick.

In some embodiments, the plug 12/plug slug 18 is a metal alloy. In other embodiments, the plug 12/plug slug 18 has a low melting temperature of about 115° C. to about 155° C. In some embodiments, the plug 12/plug slug 18 is a low melt temperature eutectic metal alloy. In at least one embodiment, the plug 12/plug slug 18 has a consistent melt out temperature with a low liquidus-solidus range of around 5° C. In some embodiments, the melt temperature of the plug 12, allows the plug 12 to melt during cook-off environments.

Materials that can be used to form the plug 12/plug slug 18 include antimony, bismuth, cadmium, copper, gallium, indium, lead, silver, tin, zinc, and any compositions thereof. In some embodiments, the plug 12/plug slug 18 is composed of bismuth, tin, and silver. In one embodiment, the plug 12/plug slug 18 is composed of 57% bismuth, 42% tin, and 1% silver. One of ordinary skill in the art will recognize that the materials used to make the alloy affect the melt out temperature and therefore, the materials can be tailored so that a desired melt out temperature can be obtained. In some embodiments, the silver in the plug 12/plug slug 18 makes the material forming the plug 12/plug slug 18 more malleable and ductile so that the plug slug 18 can be swaged or crimped into the hole 8 without developing cracks.

What is claimed is:

1. An apparatus comprising:
    a casing defining a vent opening;
    an energetic material contained in said casing; and
    a non-threaded metal plastically deformed plug oriented in said vent opening, said plug sealing said vent opening,
    wherein said casing is selected from the group consisting of an ordnance casing and a rocket motor casing.

2. The apparatus of claim 1, wherein a melting temperature of said plug is less than a melting temperature of said casing.

3. The apparatus of claim 1, said plug occupying the entire vent opening.

4. The apparatus of claim 1, wherein said plug is formed by a process of crimping or swaging.

5. The apparatus of claim 4, wherein said process comprises providing a slug, orienting at least a portion of said slug in said vent opening and applying pressure to said slug, thereby deforming said slug to form said plastically deformed plug.

6. The apparatus of claim 5, wherein said deforming causes a portion of said slug to become oriented in said vent opening.

7. The apparatus of claim 1, wherein said apparatus is an insensitive munition.

8. The apparatus of claim 1, wherein said plug is constructed and arranged to seal said vent opening until said plug melts out.

9. The apparatus of claim 1, wherein said plug and said vent opening form a venting system, said venting system reducing unplanned ignition of said energetic material.

10. The apparatus of claim 1, said plug having a plug thickness equal to or greater than said thickness of said vent opening.

11. The apparatus of claim 1, said vent opening including a groove in said wall, said groove having a groove thickness less than the thickness of said vent opening and a groove width greater than a width of said vent opening, wherein at least a portion of said plug is oriented in said groove.

12. The apparatus of claim 11, wherein said vent opening further includes a second groove, wherein a portion of said plug is oriented in said second groove.

13. The apparatus of claim 1, wherein said plug has a dimensionally controlled surface.

14. An apparatus comprising:
    a casing defining a vent opening;
    an energetic material contained in said casing; and
    a non-threaded metal plastically deformed plug oriented in said vent opening, said plug sealing said vent opening,
    wherein said apparatus is selected from the group consisting of ordnance and rocket motors.

15. An apparatus comprising:
    a casing defining a vent opening;
    an energetic material contained in said casing; and
    a non-threaded metal plastically deformed plug oriented in said vent opening, said plug sealing said vent opening,
    wherein a wall of said casing defines said vent opening, said vent opening having a thickness equal to a thickness of said wall,
    wherein said plug has a plug thickness greater than said thickness of said vent opening and said plug has a surface that is mushroomed.

* * * * *